United States Patent [19]
Carlson, Jr.

[11] 3,934,769
[45] Jan. 27, 1976

[54] SHOULDER CARRIER FOR VIDEO TAPE MACHINE AND CAMERA

[76] Inventor: David Carlson, Jr., 3140 NE. Bryce, Portland, Oreg. 97212

[22] Filed: June 17, 1974

[21] Appl. No.: 479,600

[52] U.S. Cl................ 224/5 V; 224/5 H; 224/25 A
[51] Int. Cl.² .......................................... A45F 5/00
[58] Field of Search......... 224/5 H, 5 V, 25 R, 25 A

[56] References Cited
UNITED STATES PATENTS

| | | | |
|---|---|---|---|
| 2,676,207 | 4/1954 | Hunt................................. | 224/5 H |
| 3,767,095 | 10/1973 | Jones................................ | 224/5 V |

Primary Examiner—Robert G. Sheridan
Attorney, Agent, or Firm—Eugene M. Eckelman

[57] ABSTRACT

A pair of rearwardly extending hooks are arranged to engage respective shoulders of a cameraman, and these hooks support a carrier body portion defining a top opening pocket for removably receiving a battery operated portable video tape machine. A standard extends up from the body portion at the front of the body on which a video camera is supported at eye level. The standard has adjustment vertically, laterally, and pivotally for suitable positioning of the camera to the eye of the cameraman. The framework includes side and front brackets for removably holding accessory equipment.

5 Claims, 5 Drawing Figures

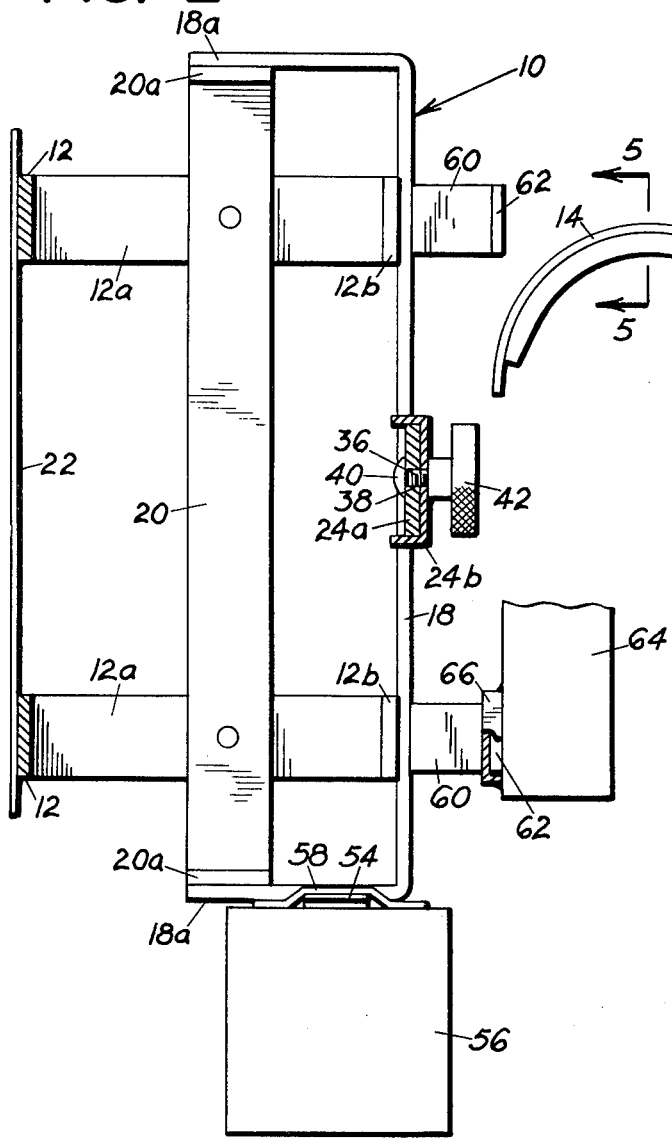
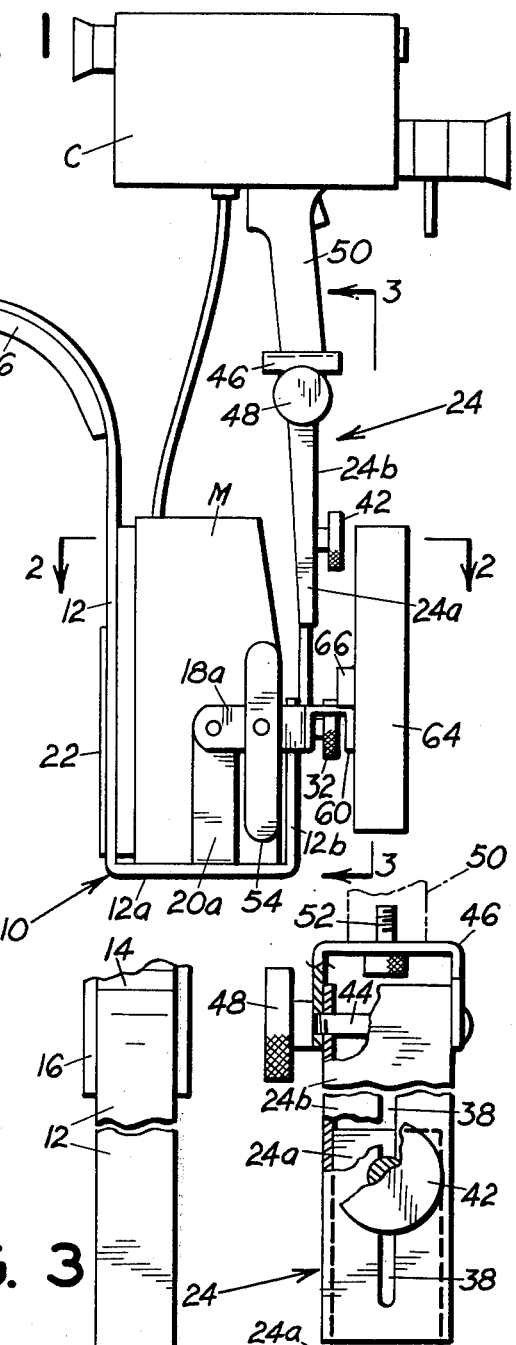
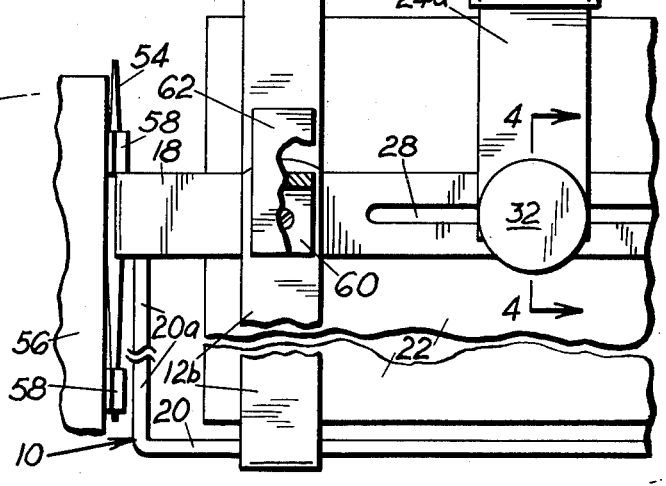
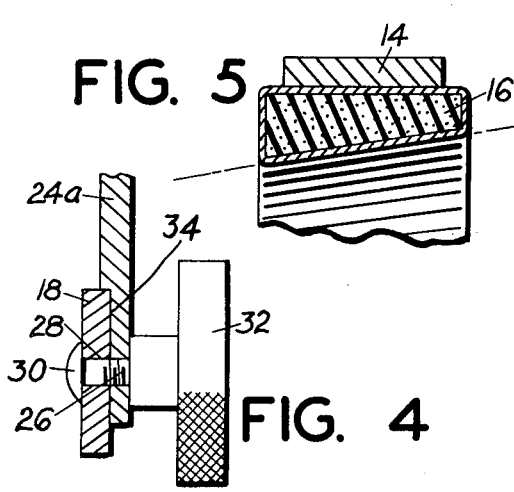

SHOULDER CARRIER FOR VIDEO TAPE MACHINE AND CAMERA

BACKGROUND OF THE INVENTION

This invention relates to new and useful improvements in carriers for body-held camera equipment and particularly pertains to carriers for video cameras and battery operated portable video tape machines.

Carriers for cameras have heretofore been provided which support the camera on the body of the cameraman in an arrangement whereby the cameraman is free to use his hands for operating the camera. Video tape cameras now in use are associated with a video tape machine connected to the camera by suitable wiring. In devices now in use, the cameraman carries the camera on a carrier and the video tape machine is generally strapped on his back or on his waist, or is carried by another person. Such arrangement is not satisfactory since not only is it tiring to carry the accessory equipment but such arrangement does not provide for free movement of the cameraman in all directions, particularly in pivot movements at the waist such as forward and rearward tilting and swinging from side to side.

SUMMARY OF THE INVENTION

According to the present invention and forming a primary objective thereof, a shoulder carrier is provided for a portable camera and video tape machine which has support on both shoulders and which is unitized and capable of being carried at the front of the cameraman to provide visibility of meters and counters and easy access to controls and to provide free movement of the cameraman in pivot movements at the waist. In addition, the structural arrangement of the carrier is such that it has comfortable engagement with the body.

Another object of the invention is to provide a shoulder carrier of the type described which has a body portion defining a top opening pocket for readily receiving the video tape machine and which has a front standard for supporting a camera at eye level to the cameraman.

Another object is to provide a shoulder carrier of the type described wherein the standard for supporting the camera has adjustment vertically, laterally, and pivotally so as to be capable of moving the camera to the selected position desired by the cameraman.

Still another object is to provide a shoulder carrier of the type described having brackets on one or both of the sides and front of the body portion for removably supporting accessory equipment.

The invention will be better understood and additional objects and advantages will become apparent from the following description taken in connection with the accompanying drawings.

BRIEF DESCRIPTION OF THE DRAWINGS

FIG. 1 is a side elevational view of the present carrier showing a camera and video tape machine carried thereby;

FIG. 2 is an enlarged vertical horizontal sectional view taken on the line 2—2 of FIG. 1;

FIG. 3 is a fragmentary front elevational view, partly broken away, taken on the line 3—3 of FIG. 1;

FIG. 4 is an enlarged fragmentary sectional view taken on the line 4—4 of FIG. 3; and FIG. 5 is an enlarged fragmentary sectional view taken on the line 5—5 of FIG. 1.

DETAILED DESCRIPTION OF A PREFERRED EMBODIMENT

With particular reference to the drawings and first to FIGS. 1, 2 and 3, the carrier includes a body portion 10 having a pair of rear upright strap-like frame members 12 terminating at their upper ends in rearwardly turned hooks 14 arranged to engage over respective shoulders of a cameraman. The underside of these hook portions preferably has padding 16, also seen in FIG. 5, for comfort to the cameraman. Each upright frame member 12 has right angle, forwardly projecting bottom extensions 12a which in turn have right angle upright extensions 12b short length, namely of a length only partially the height of the frame members 12.

A horizontal laterally extending frame member 18 is secured across the front of the upright extensions 12b at an upper portion of the latter and have right angle rearward extensions 18a at the sides, the frame member 18 extending laterally on both sides beyond the extensions 12a as best seen in FIG. 2. A bottom frame member 20 extends across and is secured on top of the extensions 12a at a point intermediate the frame members 12 and their extensions 12b and has upright extensions 20a at its ends which project upwardly on the inside of the extensions 18a and which are secured thereto, the upper ends of extensions 20a terminating at about the top edge of the extensions 18a. The intersecting portions of the frame members are secured together in any suitable manner such as by riveting to form a rigid body portion. This body portion is open at the top and arranged to receive a video tape machine M therein. The back end of the body portion has a flat plate 22 secured thereto, as by suitable rivets, to provide a flat comfortable engaging surface for the framework against the cameraman's body.

A standard 24 is supported on the body portion and comprises a vertical bar 24a on the front frame member 18. The securement of bar 24a to the frame member 18 is detailed in FIG. 4 and is accomplished by a screw 26 extending through the bar 24a and slidably adjustable laterally in a slot 28, also seen in FIG. 3, in the frame member 18. The head 30 of the screw is disposed on the rearward side of the frame member 18 and is enlarged relative to the slot 28, and the threaded or shank end of the screw receives an enlarged knurled tightening nut 32. Preferably, the bottom end of the bar 24a on the rearward side thereof is notched at 34 to fit on the frame member 18 and provide a rigid upright support for the bar. Upon loosening nut 32, the bar 24 may be adjusted laterally for a purpose to be more fully described hereinafter.

A channel-shaped extension 24b is fitted on the bar 24a and has vertical supported adjustment thereon by means of a screw 36 extending through a slot 38 in the extension 24b and having its head 40 engaged on the rearward side of the bar 24a. The screw has an enlarged knurled tightening nut 42 thereon which upon being tightened is adapted to hold the extension 24b vertically in a selected adjusted position.

The upper end of the extension 24b receives a cross screw 44 through its side walls, FIG. 3, and an inverted U-shaped head 46 is supported on the screw 44 with the legs thereof on the outer sides of the extension 24b. The screw 44 has an enlarged knurled tightening nut 48 thereon which upon being tightened holds the head 46 in a selected pivoted position relative to the extension 24b. A camera C to be supported by the present carrier has a handle or leg portion 50 to the bottom end of which is seated on the head 46 and removably secured thereto by a screw 52 extending up through the top of the head 46 and threadedly engaged in the bottom of handle 50.

An upright bracket 54 is secured on the outer side of frame member 18a for holding accessory equipment 56, FIGS. 2 and 3. This bracket has a narrow, plate-like construction, preferably with tapered end portions arranged to receive support straps 58 or the like on the accessory 56. Brackets 54 may be provided on one or both sides. Also, a pair of inverted U-shaped brackets 60 are secured on the front of front frame member 18 and have upright tabs 62 for supporting an accessory 64, shown only in FIG. 2, through the medium of bottom opening sockets 66 on the rear wall of accessory.

According to the present invention, a carrier is provided for a portable video type camera and the video tape machine which accompanies the camera. The carrier is designed for a cameraman to comfortably carry the camera with the body portion 10 disposed at his front. The video tape machine M is placed in the body portion by inserting it through the open top thereof and the camera is secured on the head 46 by means of screw 52. With the camera in its normal viewing position, the video machine cannot be displaced upwardly from the body portion, and when it is desired that this machine be removed, the camera and head 46 must be swung forward on the shaft 44. This serves as a safety feature in that the video tape machine M cannot be accidentally displaced.

The cameraman in use of the present carrier adjusts the camera C to its selected position for viewing by vertical adjustment through means of the screw 42, by pivotal adjustment through means of the screw 44, and lateral adjustment through means of the screw 32, the latter screw facilitating viewing by the cameraman by his left or right eye as desired. The carrier thus supports the camera and video tape machine in one compact unit and allows the cameraman to swing the camera from side to side and also to tilt forwardly and rearwardly, or otherwise, merely by movements of his body. The body portion 10 is carried high enough on the body so as not to interfere with the body movement. Frame members 12a are flat so that the unit will stand by itself when not in use.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A shoulder carrier for a portable camera and associated videotape machine, comprising
   a. a body portion having front, rear and side portions,
   b. a pair of rearwardly extending hooks on said body portion arranged for engagement frontwise over the shoulders of a cameraman for supporting said body portion in front of a cameraman above the waist,
   c. means in said body portion defining a pocket arranged to removably receive and hold a video tape machine,
   d. an upright standard secured at its lower end to the front of said body portion and projecting above said pocket,
   e. means at the upper end of said standard to support a camera thereon which is electrically connected to the video tape machine,
   f. and bracket means on said body portion exteriorly of said pocket for holding accessory equipment.

2. The shoulder carrier of claim 1 wherein said upright standard is arranged to support a camera at eye level to the cameraman, and lateral axis pivot means intermediate the upper and lower ends of said standard to provide forward and rearward pivotal adjustment of the camera support means for selected adjustment of the camera to the eye of the cameraman.

3. The shoulder carrier of claim 2 wherein said pocket is open at the top for receiving a video tape machine, said rearward pivotal adjusted position of said camera support means locating the latter above the pocket to hold a video tape machine therein against accidental displacement and said forward pivoted adjusted position locating said camera support means out of the way of the top opening of the pocket to allow a video tape machine to be removed from the pocket.

4. The shoulder carrier of claim 1 wherein said bracket means includes a side bracket for removably holding accessory equipment.

5. The shoulder carrier of claim 1 wherein said bracket means includes a side bracket for removably holding accessory equipment and a front bracket also for removably holding accessory equipment.

* * * * *